J. K. PROCTOR.

Cylinders for Burring-Machines.

No. 5,493. Reissued July 15, 1873.

Witnesses.
C. Connolly
A Connolly

Inventor
Josiah K. Proctor
by Connolly Bros
Attys.

AM. PHOTO-LITHOGRAPHIC CO. N.Y. (OSBORNE'S PROCESS)

UNITED STATES PATENT OFFICE.

JOSIAH K. PROCTOR, OF PHILADELPHIA, PENNSYLVANIA, ASSIGNOR OF ONE-HALF INTEREST TO CHARLES R. LINDSAY.

IMPROVEMENT IN CYLINDERS FOR BURRING-MACHINES.

Specification forming part of Letters Patent No. 132,690, dated October 29, 1872; reissue No. 5,493, dated July 15, 1873; application filed April 12, 1873.

*To all whom it may concern:*

Be it known that I, JOSIAH K. PROCTOR, of Philadelphia, in the county of Philadelphia and State of Pennsylvania, have invented certain new and useful Improvements in Clothing Burr-Cylinders, Cards, Feed-Rolls, &c.; and I do hereby declare the following to be a full, clear, and exact description of the invention, such as will enable others skilled in the art to which it pertains to make and use it, reference being had to the accompanying drawings which form part of this specification, in which—

Figure 1:
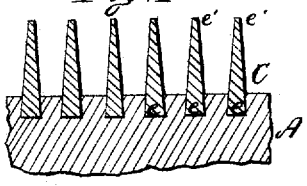
Figure 2:
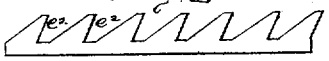

Figure 1 is a longitudinal section of a part of a cylinder having teeth or wire set in the same, showing the form of the cross-section of the wire. Fig. 2 is a side view of a detached piece of wire having teeth cut in the same.

This invention consists in clothing cylinders for carding-engines, burring-machines, &c., with wire, which, in cross-section, is wedge-shaped, said wire being inserted and secured in grooves in the cylinders, as hereinafter set forth.

Referring to the drawing, which illustrates my invention, A represents a portion of a cylinder or roll, in which is arranged the toothed wire C, shown in cross-section, having its lower or inner edge *e* considerably thicker than its upper or outer edge $e^1$, the teeth $e^2$ being cut in the latter. A groove is turned or cut spirally in the cylinder of suitable width, and of a proper depth to receive the thick edge of the wire, which is, by means of a suitable tool, wound therein, and is, at the same time, followed by a thin convex-edged roll, which is brought to bear upon the metal of the cylinder between the turns of the groove, depressing and expanding said metal so as to cause it to close over and embrace the thick edge of the wire, and thus hold it firmly and immovably in the groove of the cylinder.

I am aware that wire has been made for this purpose, having a lip or flange on its lower edge for the purpose of securing it in the above-described manner; but there are several objections to such form of wire, one of which is that, in drawing it with the lip or flange, it becomes hardened and brittle, and consequently liable to break when being applied to the cylinder. Another difficulty is that, in closing the metal of the cylinder over the flange or lip, a thin sharp edge of said metal is turned over, and when the cylinder is made of cast-iron, which is usually the case, this thin edge crumbles away and the wire becomes loosened.

It is to overcome these and other objections that I have devised the present construction, which possesses the following advantages: First. The wire does not harden in drawing, and may be readily wound into a small roll without producing the slightest fracture. Second. In closing the metal of the cylinder around the wire, as described, it has to embrace an even enlargement or taper, which presents no abrupt corners or edges to be closed upon. After being closed upon the wire the metal is strong and firm, and will not yield or break away.

The teeth which are cut in this form are more readily stripped or cleared of the fibrous material by reason of their being in a tapering form, and for the same reason the tooth presents greater strength.

What I claim as my invention, and desire to secure by Letters Patent, is—

In combination with a grooved cylinder, the toothed wire, constructed as shown, wedge-shaped in cross-section, and applied by having its base inserted in the spiral groove of said cylinder, and secured therein by the compression of the metal of the cylinder around it, as specified.

In testimony that I claim the foregoing I have hereunto set my hand in the presence of two witnesses.

JOSIAH K. PROCTOR.

Witnesses:
JAS. MCNEILE,
W. W. DOUGHERTY.